United States Patent Office 3,697,378
Patented Oct. 10, 1972

3,697,378
**DEXTRINIZATION OF STARCH WITH α-AMYLASE FROM *BACILLUS COAGULANS***
Henry M. Smalley, Ulverston, England, assignor to Glaxo Laboratories Limited, Middlesex, England
No Drawing. Filed Sept. 8, 1969, Ser. No. 856,197
Claims priority, application Great Britain, Sept. 9, 1968, 42,856/68
Int. Cl. C12d 13/10
U.S. Cl. 195—31 R     19 Claims

ABSTRACT OF THE DISCLOSURE

An α-amylase having a molecular weight of 11,000±1000 as determined by the method of Andrews, Biochem. J. 1964, 91, 222; a pH for optimal activity at 37° C. of 4.8; in the purified state an optimal pH for thermal stability in the range 6–8; in the purified state a half-life at 90° C. of 90 minutes; in the presence of starch a half-life at 90° C. of 120 minutes; in 20 mm. glycerophosphate/acetate buffer containing calcium chloride at a molarity of 5 mm. and 0.5% starch at pH 5–7, an optimal temperature for activity of 75° C.; an optimal calcium molarity for enzymic activity of 5–25 mm.; enhanced stability in the presence of organic acids; ability to degrade starch to produce polysaccharides consisting of 6 glucose units; ability to attack the cycloheptylamylose system in Schardinger β-dextrins; and a mobility of 5 cm. towards the anode on gel electrophoresis for 16 hours at 4° C. at 400 volts and 20 ma. on 5% polyacrylamide gel in tris-borate-EDTA buffer at pH 8.7.

The α-amylase is prepared by submerged aerobic culture of *B. coagulans* strain NCIB 10278 or a mutant thereof in a nutrient medium and isolating the enzyme therefrom. The enzyme is used for the dextrinisation of starch in an aqueous medium at a temperature of 80° C. or greater.

---

This invention concerns a novel α-amylase and a process for its preparation.

α-Amylase enzymes are widely used in the thinning or dextrinisation of starch for example in glucose production. Such dextrinisation reactions, as is the case with other enzyme-catalysed reactions, proceed more rapidly at high temperatures provided that the enzyme is not destroyed and it has been found that bacterial α-amylases are especially useful in that their preferred temperature for dextrinisation is of the order of 80° C.

We have now developed a new bacterial α-amylase, derived from *B. coagulans*, which is active at even higher temperatures and hence is of particular use in the high temperature dextrinisation of starch.

According to the present invention therefore, we provide an α-amylase derived from *B. coagulans* having the characteristics (a) to (e) defined as follows:

(a) The new enzyme possesses a molecular weight of 11,000±1000 as determined by the method of Andrews (Biochem. J. 1964, 91, 222).

(b) The pH for its optimal activity is characteristic and at 37° C. is 4.8 for the purified enzyme. The enzyme activity is calcium dependent and the optimal calcium molarity is 5–25 mM. The pH for thermal stability of the purified enzyme is in the range 6–8, i.e. about neutral and in this range, the half-life of the purified enzyme at 90° C. is about 90 mins, while in the presence of starch the half-life at 90° C. is about 120 mins. The optimal temperature for enzyme actiivty is 75° C. in the pH range 5–7 as determined on a 0.5% solution of starch in th epresence of 20 mM. glycerophosphate-acetate buffer and 5 mM. calcium chloride, the time required between the limits 15–40 minutes for the starch solution to be digested to a fixed end point being inversely proportional to the number of SKB units in the enezyme preparation. (Sandstedt, Kneen and Blish, Cereal Chemistry, (1939), 16, 712).

(c) The thermostability of the enzyme is also affected by the level of calcium present; the optimal molarity of calcium ions for maximum stability at 90° C. is between 2 and 20 mM. Ionic strength also affects the thermostability of the enzyme and the optimal ionic strength at 90° C. is 50–100 mM. Organic acids stabilise the enzyme, for example glutaric and maleic acids, and tartaric acid is especially effective, its optimal molarity being about 18 to 25 mM. The enzyme is readily adsorbed from aqueous solution onto starch and at pH 7.0 and 4° C. 1.0 g. maize starch adsorbs 1,000 SKB units to purified α-amylase, the amount adsorbed being independent of the enzyme-concentration. Another characteristic of the enzyme is its tendency to degrade starch to produce a large proportion of polysaccharide consisting of 6 glucose units joined together, which is further degraded more slowly than by other α-amylases such as that from *B. subtilis*.

(d) A still further characteristic of the new enzyme is its ability to attack the cycloheptamylose system in Schardinger β-dextrins.

(e) The purified enzyme possesses the following electrophoresis characteristics: Gel electrophoresis on 5% polyacrylamide gel in tris-borate-EDTA buffer pH 8.7 at 4° C. for 16 hours at 400 v. and 20 mA. showed only one zone of activity; this had a mobility of 5 cm. towards the anode.

According to a further feature of the invention we provide a process for the dextrinisation of starch wherein starch in an aqueous medium is treated with an α-amylase according to the invention at a temperature of the order of 80° C. or greater, preferably at least 90° C. or even 100° C.

The new enzyme may be obtained in accordance with a further feature of the invention by submerged aerobic culture of an α-amylase producing strain of *B. coagulans* on a nutrient medium therefor followed by isolation of the enzyme therefrom.

The submerged aerobic culture of the *B. coagulans* organism is found to produce particularly high yields of the enzyme as compared with anaerobic culture such as, for example, culture in stationary flasks.

The nutrient medium will contain a source of carbon and energy, a source of nitrogen and a source of nutrient trace elements. The source of carbon and energy may, for example, be a carbohydrate, e.g. a sugar such as lactose, fructose, or sucrose, or starch, or a natural source of carbon and energy, for example, skim milk, whey powder or maize oil. We have found that particularly high yields of enzyme can be obtained using glycerol as principal source of carbon and energy. We have also found that contrary to previous suggestions for the culture of *B. coangulans*, starch is not obligatory for α-amylase production. The percentage of carbon source in the medium is conveniently not greater than 4.0% by weight e.g. abuot 0.5–3.0% by weight.

The source of nitrogen will advantageously be a substance of organic origin such as soya meal, fish meal, skim milk, tryptose, casein hydrolysate, whey powder, peptone or distillers' solubles. Particularly high yields of enzyme may be obtained using yeast extracts as nitrogen source, especially Yeatex granules (sold by English Grains Co. Ltd.). It will be noted that some substances such as skim milk or whey powder may serve as source of nitrogen, carbon and energy. The percentage of nitrogen source in the medium expressed as nitrogen is conveniently between 0.025 and 0.3% by weight of the medium.

The nutrient trace elements include, in particular, calcium ions and chalk may be added as a convenient source particularly since it is capable of neutralising acid produced during the fermentation. The percentage of chalk in the medium is conveniently in the range 4–6% by weight. Other trace elements will generally be present in sufficient quantity in the natural nutrients listed above which, for that reason, are preferred.

The pH of the culture medium is preferably in the range 5–8, advantageously between 6 and 7. A buffer is advantageously present, for example phosphate buffer.

The temperature of the medium during culture is especially significant since it appears to be possible to improve the titre of highly thermostable α-amylase by culturing at high temperatures e.g. in the range 40–65° C. The optimal growth temperature is about 55° C.

The strain of B. coagulans which is cultured is preferably NCIB 10278 or a mutant thereof and in particular strain NCIB 10279 and its mutants. An especially useful organism is strain NCIB 10280. These strains of B. coagulans are completely new and as indicated above, give especially high yields of the new enzyme according to the invention. According to a further feature of the invention, therefore, we provide a process for the production of α-amylase-producing B. coagulans wherein B. coagulans, strain NCIB 10278 or a mutant thereof, especially strain NCIB 10279 or strain NCIB 10280 is cultured on a nutrient medium therefor.

The culture for enzyme production will usually be initiated by addition to the nutrient medium of an inoculum containing the organism. The medium used for inoculum production may be closely similar to that for culture of the organism but is advantageously aerated less vigorously. The growth of this inoculum may be initiated by addition to the medium of a cell-suspension from an agar culture of the organism.

For the better understanding of the invention the following examples are given by way of illustration only; all temperatures are in ° C.:

EXAMPLE 1

(1) Shake flask fermentation 20 ml. of saline (0.9% by weight sodium chloride solution) was added to an agar culture of B. coagulans strain NCIB 10280 and 1 ml. of the cell suspension was used to inoculate a 250 ml. baffled conical flask containing 20 ml. of a seed medium (P2) having the following composition:

| Ingredients: | Percent by weight |
|---|---|
| Glycerol | 0.7 |
| Yeatex granules | 1.0 |
| Sodium dihydrogen phosphate | 0.16 |
| pH 5.8. | |

After 18 hours of growth at 55° on a rotary shaker at 220 r.p.m. 1 ml. of the cell suspension was used as inoculum for 20 ml. of the following medium in a 250 ml. baffled conical flask:

| Ingredient: | Percent by weight |
|---|---|
| Glycerol | 2.0 |
| Yeatex granules | 3.5 |
| $Na_2HPO_4$ | 0.25 |
| $KH_2PO_4$ | 0.1 |
| Chalk | 4.0 |

Amylase was produced in the broth filtrate after a 48 hour fermentation at 55° on a rotary shaker and was determined by an autoanalyser method based on the SKB assay (Sandstedt, Kneen and Blish, Cereal Chemistry (1939), 16, 712). A titre of 4.00 SKB unit/ml. was obtained.

EXAMPLE 2

A 2 litre round bottomed flask containing 500 ml. of medium P2 was inoculated with 5 ml. of a cell suspension from an agar culture of B. coagulans, Glaxo Laboratories Limited strain α5 (mutant of strain NCIB 10278) and the culture was grown for 18 hours at 55° on a rotary shaker. This provided inoculum (2% v./v.) for a 5-litre fermenter containing 3 litres of the same medium.

This seed stage was aerated at 2 l./min. and agitated by 2 x 3" turbo impellers stirring at 550 r.p.m. After inoculation it was grown at 55° and the growth was estimated by measuring the optical density of the culture against a water blank using an Evans Electroselenium Limited portable colorimeter with a 621 filter. 60 ml. of the culture at an optical density of 25 units on 1 in 2 dilution of the broth was transferred to a 5-litre fermenter containing 3 litres of the following sterile medium:

| | Percent by weight |
|---|---|
| Glycerol | 2.0 |
| Yeatex | 2.5 |
| $Na_2HPO_4$ | 0.25 |
| Salts—$KH_2PO_4$ | 0.1 |
| NaCl | 0.1 |
| Chalk (separately sterilised) | 7.5 |

The production stage was fermented under similar conditions as the seed stage but with the air flow increased to 5 l./min. The amount of amylase was determined by the auto-analyser method of the SKB assay. The formation of amylase was detectable 10–20 hours after inoculation.

Amylase production occurred during the growth stage of the organism when the glycerol was being utilised and the pH of the broth falling. A titre of 2 SKB units/ml. was obtained.

EXAMPLE 3

B. coagulans strain NCIB 10279 was kept in freeze-dried ampoules and subcultured every 3 days and incubated at 55° at pH 7.2 (NaOH) on a medium containing:

| Ingredient: | Percent by weight |
|---|---|
| Oxoid peptone | 1.0 |
| NaCl | 0.5 |
| Oxoide yeast extract | 0.1 |
| Lab-Lemco | 1.0 |
| Oxoid agar | 1.5 | for one day when it was used to inoculate 100 ml. of the following sterile medium in a 250 ml. conical flask:

| Ingredient: | Percent by weight |
|---|---|
| Glycerol | 0.7 |
| Yeatex | 2.5 |
| $Na_2HPO_4$ | 0.25 |
| $KH_2PO_4$ | 0.1 |
| NaCl | 0.1 |
| Light ppted. $CaCO_3$ separately sterilised | 0.5 |
| pH 7.3. | |

The inoculated shake-flask was incubated at 55° for 10 hours on a rotary shaker with a 2" throw and a speed of 220 r.p.m. At the end of this time the well grown culture was used to inoculate 3 litres of the following medium (sterilised for 90 minutes at 15 pounds per square inch gauge) in a 5-litre fermenter:

| Ingredient: | Percent by weight |
|---|---|
| Glycerol | 0.7 |
| Yeatex (granules) | 2.5 |
| $Na_2HPO_4$ (anhydrous) | 0.25 |
| $KH_2PO_4$ | 0.1 |
| NaCl | 0.1 |
| Natural pH 6.35. | |

Light precipitated Chalk separately sterilised at 5.0%.

This was incubated at 65°, agitated at 550 r.p.m. and aerated at 3 litres air per minute for six hours during which time the pH rose from 6.6 to 7.05 and good growth was established.

The contents of this fermenter was transferred to 400 litres of the following fermentation medium at pH 6.3–7.0 (adjusted if necessary by the addition of potassium hydroxide solution after sterilisation for 30 minutes at 50°, 30 minutes at 90° and 90 minutes at 120°):

| Ingredient: | Percent by weight |
|---|---|
| Glycerol | 0.7 |
| Yeatex (granules) | 2.5 |
| Na$_2$HPO$_4$ (anhydrous) | 0.25 |
| KH$_2$PO$_4$ | 0.1 |
| NaCl | 0.1 |

Light precipitated Chalk separately sterilised 2.5%.

This was stirred at 350 r.p.m. aerated with 20 cubic feet air per minute and maintained at 55° C. for 20 hours during which time the pH fell from 7.45 to 7.0, good growth was established and an α-amylase activity of 0.21 SKB. μ/ml. was obtained.

100 litres harvest broth containing by assay a total of about 23,000 SKB. units of activity was filtered on a rotary filter with a hyflo Keiselguhr precoat at room temperature and the filtrate stirred with 5 g./litre creamy maize starch for ¼ hour at pH 7.0 and 6°. The suspension was filtered through a Whatman No. 54 filter paper on a Doulton filter, washed with 500 ml. ice-cold distilled water and dried at 55° in a hot air oven.

446 g. of adsorbate containing about 23,000 SKB. units of α-amylase activity were obtained. The adsorbate contained 11.47% w./v. moisture and the total protein content was 6.86 mg./g. which represents a specific activity of 7.76 μ/mg. protein.

Morphological characterisation of *B. coagulans* Strain NCIB 10280:

Rods: Gram positive, 0.6–1.0 x 2.5–5.0 microns, motile.
Spores: 0.9–1.0 x 1.2–1.5 microns, ellipsoidal, thin walled, subterminal to terminal; Sporulation poor in usual media.
Sporangia: Swollen.
Agar slants: Growth very scant—smooth, translucent and flat.
Agar colonies: Small, round, opaque, not distinctive.
Glucose agar slants: Growth poor—as on nutrient agar. Acid but no gas produced from glucose and from sucrose and glycerol but not from arabinose, xylose, lactose and mannitol.
Glucose broth: pH 5.0 or less in 7 days.
Nitrate: Was reduced to nitrite.
Gelatin streak agar: Zone of hydrolysis (if any) small.
Growth requirements: Nicotinic acid, biotin and thiamin required. No growth at 37° C.; growth from 45 to 65° C., optimal at 55–60° C.

Strains NCIB 10278 and NCIB 10279 showed substantially similar morphology and properties.

I claim:

1. An α-amylase from *B. coagulans* strain NCIB 10278 or a mutant thereof, said α-amylase having the following characteristics:

(1) a molecular weight of 11,000±1000 as determined by the method of Andrews, Biochem. J. 1964, 91, 222;
   (2) a pH for optimal activity at 37° C. for 4.8;
   (3) in the purified state an optimal pH for thermal stability in the range 6–8;
   (4) in the purified state a half-life at 90° C. of 90 minutes;
   (5) in the presence of starch a half-life at 90° C. of 120 minutes;
   (6) in 20 mM. glycerophosphate/acetate buffer containing calcium chloride at a molarity of 5 mM. and 0.5% starch at pH 5–7, an optimal temperature for activity of 75° C.;
   (7) an optimal calcium molarity for enzymic activity of 5–25 mM.;
   (8) enhanced stability in the presence of organic acids;
   (9) ability to degrade starch to produce polysaccharides consisting of 6 glucose units;
   (10) ability to attach the cycloheptylamylose system in Schardinger β-dextrons; and
   (11) a mobility of 5 cm. towards the anode on gel electrophoresis for 16 hours at 4° C. at 400 volts and 20 mma. on 5% polyacrylamide gel in tris-borate-EDTA buffer at pH 8.7.

2. A process for the preparation of an α-amylase as claimed in claim 1 comprising submerged aerobic culture of *B. coagulans* strain NCIB 10278 or a mutant thereof in a nutrient medium therefor containing a source of carbon and energy, a source of nitrogen and a source of nutrient trace elements followed by isolation of the enzyme therefrom.

3. A process as claimed in claim 2 in which *B. coagulans* strain NCIB 10279 is cultured.

4. A process as claimed in claim 2 in which *B. coagulans* strain NCIB 10280 is cultured.

5. A process as claimed in claim 2 in which the source of carbon and energy is selected from the group consisting of a carbohydrate, skim milk, whey powder, glycerol and maize oil.

6. A process as claimed in claim 5 in which the carbohydrate is selected from a sugar and a starch.

7. A process as claimed in claim 2 in which the percentage of carbon source in the medium is not greater than 4.0% by weight.

8. A process as claimed in claim 7 in which the percentage is from 0.5 to 3.0% by weight.

9. A process as claimed in claim 2 in which the source of nitrogen is a substance of organic origin selected from the group consisting of soya meal, fish meal, skim milk, tryptose, casein hydrolysate, whey powder, peptone, distillers' solubles and yeast extract.

10. A process as claimed in claim 2 in which the percentage of the source of nitrogen is from 0.025 to 0.3% by weight expressed as nitrogen in the medium.

11. A process as claimed in claim 2 in which the nutrient trace elements include calcium provided by chalk.

12. A process as claimed in claim 11 in which the percentage of chalk in the medium is from 4.0 to 6.0% by weight.

13. A process as claimed in claim 2 in which the pH of the culture medium is from 5 to 8.

14. A process as claimed in claim 2 in which a buffer is present in the medium.

15. A process as claimed in claim 14 in which the buffer is a phosphate buffer.

16. A process as claimed in claim 2 in which the temperature of the medium during culture is from 40 to 65° C.

17. A process as claimed in claim 16 in which the temperature is about 55° C.

18. A process as claimed in claim 2 in which the culture is initiated by addition of an inoculum to the nutrient medium, the medium used for inoculum production being less vigorously aerated than the nutrient medium used for culture.

19. A process for dextrinisation of starch wherein starch is treated with an α-amylase as claimed in claim 1 at a temperature of the order of 80° C. or greater.

References Cited

Campbell: Archives Biochemistry and Biophysics, vol. 54, pp. 154–161 (1955).

LIONEL M. SHAPIRO, Primary Examiner

U.S. Cl. X.R.

195—62, 66 R